United States Patent
Itou (10) Patent No.: US 11,885,231 B2
(45) Date of Patent: Jan. 30, 2024

(54) TURBOCHARGER

(71) Applicant: IHI Corporation, Tokyo (JP)

(72) Inventor: Koutarou Itou, Tokyo (JP)

(*) Notice: Subject to any disclaimer, the term of this patent is extended or adjusted under 35 U.S.C. 154(b) by 0 days.

(21) Appl. No.: 18/152,831

(22) Filed: Jan. 11, 2023

(65) Prior Publication Data

US 2023/0160320 A1    May 25, 2023

Related U.S. Application Data

(63) Continuation of application No. PCT/JP2021/032704, filed on Sep. 6, 2021.

(30) Foreign Application Priority Data

Sep. 14, 2020 (JP) ................................ 2020-153766

(51) Int. Cl.
- *F01D 25/16* (2006.01)
- *F01D 9/02* (2006.01)
- *F01D 25/12* (2006.01)

(52) U.S. Cl.
CPC ............. *F01D 25/164* (2013.01); *F01D 9/02* (2013.01); *F01D 25/125* (2013.01); *F05D 2220/40* (2013.01); *F05D 2250/232* (2013.01); *F05D 2260/231* (2013.01); *F05D 2260/38* (2013.01)

(58) Field of Classification Search
CPC ........ F01D 25/164; F01D 9/02; F01D 25/125; F01D 2240/40
See application file for complete search history.

(56) References Cited

U.S. PATENT DOCUMENTS

| 8,568,092 B2* | 10/2013 | Matsuyama | F02B 39/00 415/177 |
| 9,664,060 B2* | 5/2017 | Inoue | F01D 17/16 |
| 10,125,673 B2* | 11/2018 | Bayod | F02B 37/24 |

(Continued)

FOREIGN PATENT DOCUMENTS

| JP | 2009-144546 | 7/2009 |
| JP | 2013-068153 | 4/2013 |

(Continued)

OTHER PUBLICATIONS

International Preliminary Report on Patentability with Written Opinion dated Mar. 23, 2023 for PCT/JP2021/032704.

(Continued)

*Primary Examiner* — Sabbir Hasan
(74) *Attorney, Agent, or Firm* — SOEI PATENT & LAW FIRM (57) ABSTRACT

A turbocharger includes a variable nozzle disposed between a turbine housing and a bearing housing and a spring having an annular shape. The spring is disposed between the variable nozzle and the bearing housing, and is configured to generate a biasing force that biases the variable nozzle away from the bearing housing to widen a spacing between the variable nozzle and the bearing housing in a rotation axis direction. The spring includes an outer peripheral portion that applies the biasing force to the variable nozzle and an inner peripheral portion that comes into contact with the bearing housing. The outer peripheral portion of the spring is located further away from the turbine housing than the inner peripheral portion of the spring in the rotation axis direction.

16 Claims, 5 Drawing Sheets

(56) References Cited

U.S. PATENT DOCUMENTS

| | | | |
|---|---|---|---|
| 10,161,305 B2 * | 12/2018 | Ikegami | F02B 43/02 |
| 10,208,660 B2 * | 2/2019 | Bayod | F02B 37/22 |
| 10,253,683 B2 * | 4/2019 | Musil | F04D 17/10 |
| 10,302,012 B2 * | 5/2019 | Yoshizaki | F01D 17/165 |
| 11,220,957 B2 * | 1/2022 | Weiß | F02C 6/12 |
| 11,661,886 B2 * | 5/2023 | Hayashi | F01D 25/12 |
| | | | 60/598 |
| 2010/0310363 A1 | 12/2010 | Matsuyama et al. | |
| 2014/0241858 A1 | 8/2014 | Tashiro et al. | |
| 2014/0248137 A1 | 9/2014 | Inoue et al. | |
| 2018/0030848 A1 | 2/2018 | Kobayashi et al. | |
| 2018/0045106 A1 | 2/2018 | Musil et al. | |
| 2018/0355752 A1 * | 12/2018 | Shioya | F02B 37/24 |
| 2019/0024517 A1 | 1/2019 | Takeda et al. | |
| 2020/0224548 A1 * | 7/2020 | Micanek | F04B 17/00 |

FOREIGN PATENT DOCUMENTS

| | | |
|---|---|---|
| JP | 2013-245655 | 12/2013 |
| JP | 2014-169643 | 9/2014 |
| JP | 2017-067033 | 4/2017 |
| WO | 2016/159004 | 10/2016 |
| WO | 2017/126038 | 7/2017 |

OTHER PUBLICATIONS

International Search Report dated Oct. 19, 2021 for PCT/JP2021/032704.

* cited by examiner

TURBOCHARGER

CROSS-REFERENCE TO RELATED APPLICATIONS

This application is a continuation application of PCT Application No. PCT/JP2021/032704, filed on Sep. 6, 2021, which claims the benefit of priority from Japanese Patent Application No. 2020-153766, filed on Sep. 14, 2020. The entire contents of the above listed PCT and priority applications are incorporated herein by reference.

BACKGROUND

The present disclosure relates to a turbocharger.

A turbocharger described in Japanese Unexamined Patent Publication No. 2013-68153 has been known. The turbocharger includes a variable nozzle for adjusting an opening degree of a nozzle passage of a turbine. When this type of the variable nozzle is completely fixed to a housing (for example, fixed with a fastening member), there is a possibility that operation of the variable nozzle is adversely affected during thermal expansion. Therefore, the variable nozzle is fixed at a position by being appropriately pressed against a turbine housing to the extent that thermal deformation is allowed. For this reason, a disk spring is provided between the variable nozzle and a bearing housing. Then, the variable nozzle is pressed against the turbine housing and is aligned by being biased by the disk spring.

During operation of the turbocharger, one variable nozzle side with which the disk spring is in contact is at high temperature, whereas the other bearing housing side is at relatively low temperature due to being cooled by water cooling, oil cooling, or the like. Due to such a temperature difference, during operation of the turbocharger, the disk spring has a temperature distribution in which an outer peripheral side is at high temperature and an inner peripheral side is at low temperature. Furthermore, according to this temperature distribution, since the disk spring is thermally deformed to reduce a spring load, the load that presses the variable nozzle against the turbine housing may decrease. When the pressing load is small, abnormal noise, abrasion, contact between the variable nozzle and an impeller, performance change, control deviation of the variable nozzle, or the like may occur.

Therefore, the present disclosure describes a turbocharger that suppresses a reduction in spring load when a spring member that biases a variable nozzle is at high temperature.

SUMMARY

A turbocharger according to one aspect of the present disclosure includes a variable nozzle disposed between a turbine housing and a bearing housing and a spring having an annular shape. The spring is disposed between the variable nozzle and the bearing housing, and is configured to generate a biasing force that biases the variable nozzle away from the bearing housing to widen a spacing between the variable nozzle and the bearing housing in a rotation axis direction. The spring includes an outer peripheral portion that applies the biasing force to the variable nozzle and an inner peripheral portion that comes into contact with the bearing housing. The outer peripheral portion of the spring is located further away from the turbine housing than the inner peripheral portion of the spring in the rotation axis direction.

According to the turbocharger of the present disclosure, a reduction in spring load when the spring that biases the variable nozzle is at high temperature may be suppressed.

DETAILED DESCRIPTION

In the following description, with reference to the drawings, the same reference numbers are assigned to the same components or to similar components having the same function, and overlapping description is omitted. A turbocharger according to one aspect of the present disclosure includes a variable nozzle disposed between a turbine housing and a bearing housing and a spring having an annular shape.

The spring is disposed between the variable nozzle and the bearing housing, and is configured to generate a biasing force that biases the variable nozzle away from the bearing housing to widen a spacing between the variable nozzle and the bearing housing in a rotation axis direction. The spring includes an outer peripheral portion that applies the biasing force to the variable nozzle and an inner peripheral portion that comes into contact with the bearing housing. The outer peripheral portion of the spring is located further away from the turbine housing than the inner peripheral portion of the spring in the rotation axis direction.

The spring may be a disk spring that exists along a conical surface of an imaginary cone having a rotation axis as a cone axis. In addition, the turbocharger of the present disclosure may further include a heat shield plate sandwiched between the variable nozzle and the spring in the rotation axis direction to shield the spring from heat of a turbine. The first contact point of the spring may be in contact with the heat shield plate.

In addition, the variable nozzle may include two nozzle rings arranged in the rotation axis direction. One of the two nozzle rings located on a side of the bearing housing may be pressed against a predetermined portion of the turbine housing in the rotation axis direction by a biasing force of the spring.

Figure 1:
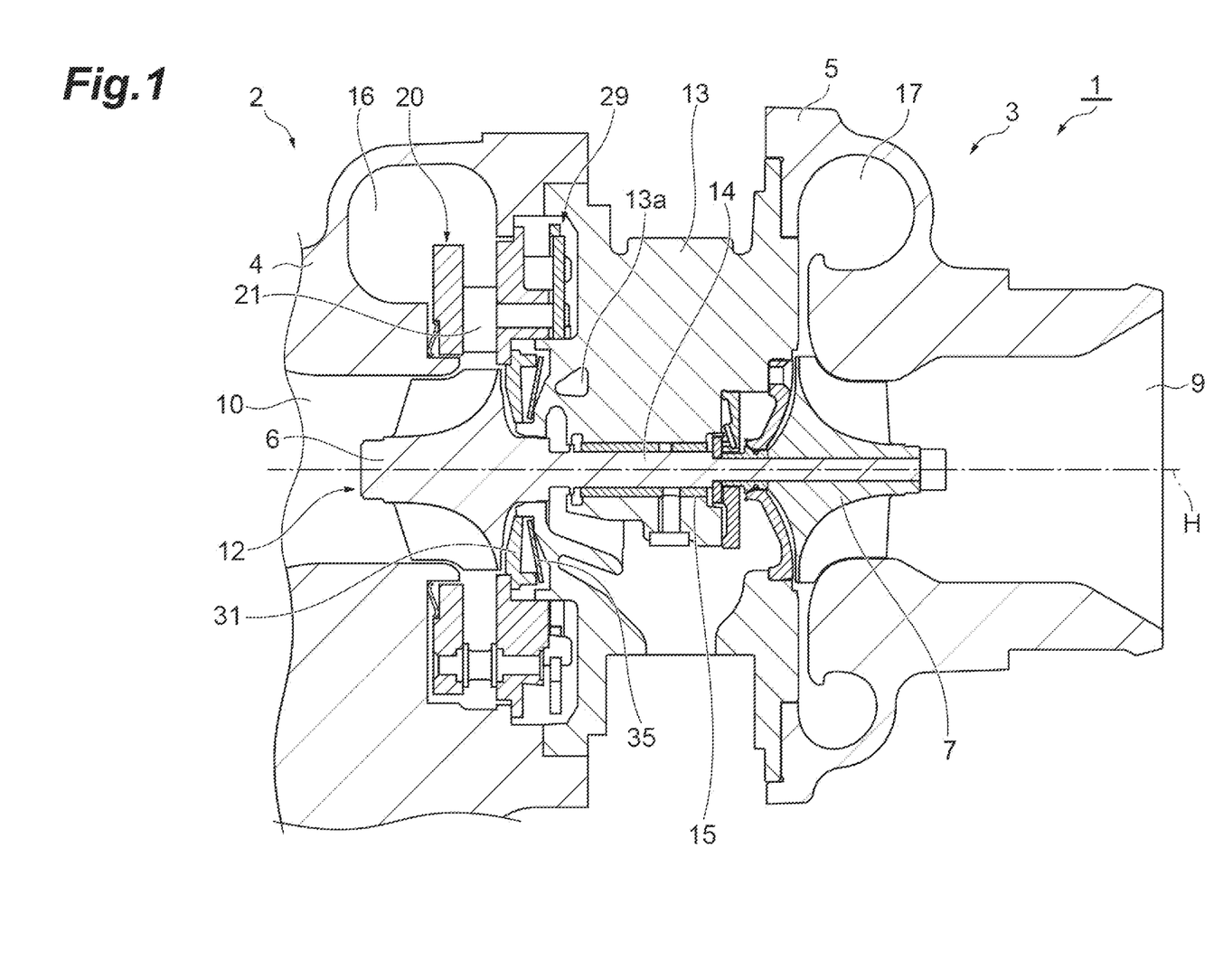
FIG. 1 is a cross-sectional view showing an example turbocharger.

FIG. 1 is a cross-sectional view of a variable capacity turbocharger 1 taken along a cross section including a rotation axis H. The turbocharger 1 is applied to, for example, internal combustion engines for ships or vehicles.

As shown in FIG. 1, the turbocharger 1 includes a turbine 2 and a compressor 3. The turbine 2 includes a turbine housing 4 and a turbine impeller 6 accommodated in the turbine housing 4. The turbine housing 4 has a scroll passage 16 extending in a circumferential direction around the turbine impeller 6. The compressor 3 includes a compressor housing 5 and a compressor impeller 7 accommodated in the compressor housing 5. The compressor housing 5 has a scroll passage 17 extending in the circumferential direction around the compressor impeller 7.

The turbine impeller 6 is provided at one end of a rotation shaft 14, and the compressor impeller 7 is provided at the other end of the rotation shaft 14. A bearing housing 13 is provided between the turbine housing 4 and the compressor housing 5. The rotation shaft 14 is rotatably supported by the bearing housing 13 via a bearing 15, and the rotation shaft 14, the turbine impeller 6, and the compressor impeller 7 integrally rotate around the rotation axis H as a rotating body 12.

The turbine housing 4 is provided with an exhaust gas inlet (not shown) and with an exhaust gas outlet 10. Exhaust gas discharged from an internal combustion engine (not shown) flows into the turbine housing 4 through the exhaust gas inlet, and flows into the turbine impeller 6 through the scroll passage 16 to rotate the turbine impeller 6. Thereafter, the exhaust gas flows to the outside of the turbine housing 4 through the exhaust gas outlet 10.

The compressor housing 5 is provided with an inlet port 9 and with an outlet port (not shown). When the turbine impeller 6 rotates as described above, the compressor impeller 7 rotates via the rotation shaft 14. The rotating compressor impeller 7 suctions outside air through the inlet port 9. The air is compressed while passing through the compressor impeller 7 and through the scroll passage 17, and is discharged from the outlet port. The compressed air discharged from the outlet port is supplied to the internal combustion engine described above.

The turbine 2 of the turbocharger 1 will be further described. An "axial direction", a "radial direction", and a "circumferential direction" simply referred to in the following description mean a rotation axial direction (rotation axis H direction), a rotation radial direction, and a rotation circumferential direction of the turbine impeller 6, respectively.

Figure 2:
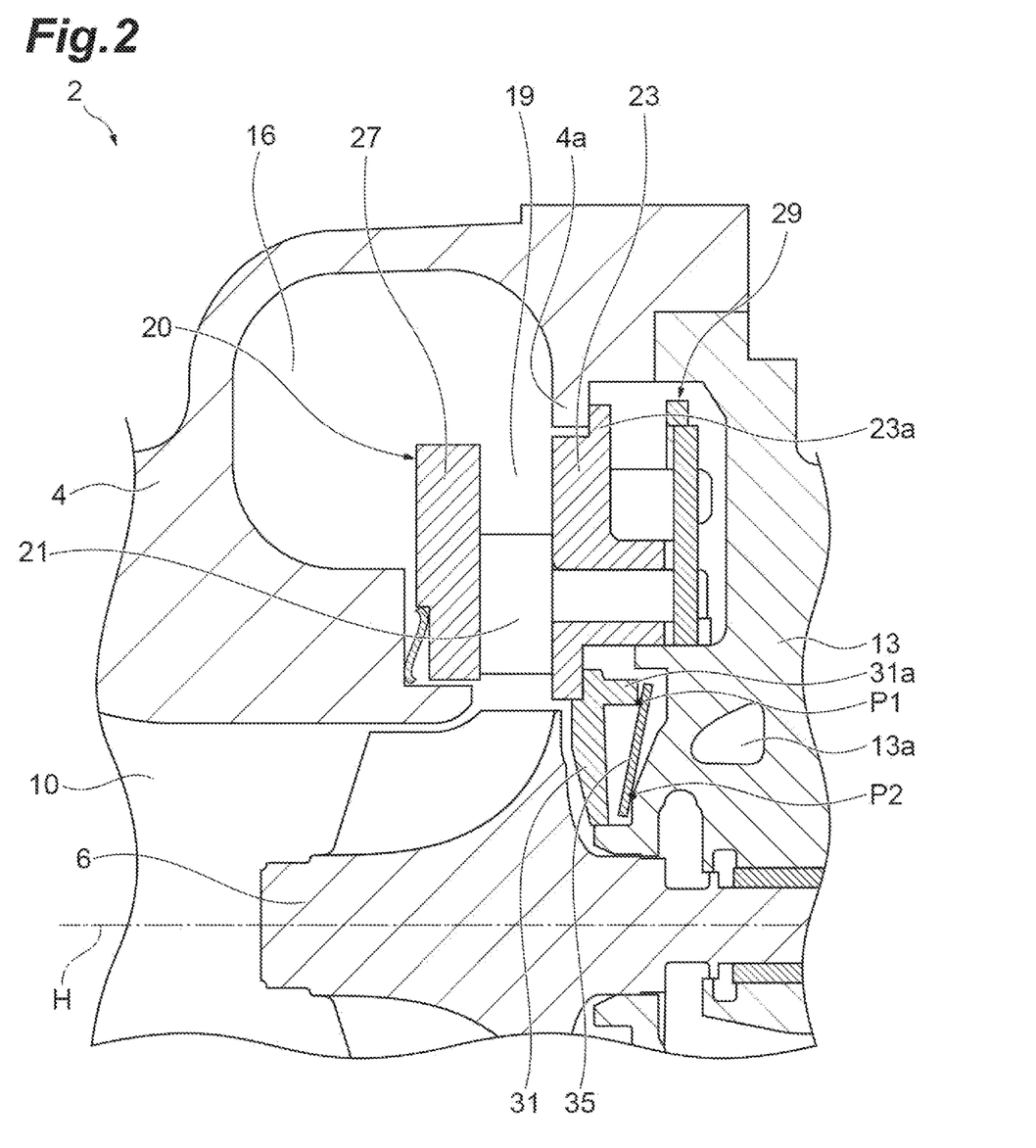
FIG. 2 is an enlarged cross-sectional view showing the vicinity of a variable nozzle of the turbocharger.

As shown in FIG. 2, the turbine 2 of the turbocharger 1 is provided with a nozzle passage 19 that connects the scroll passage 16 and the turbine impeller 6. A plurality of movable nozzle vanes 21 are provided in the nozzle passage 19. The plurality of nozzle vanes 21 are disposed at regular intervals on a circle around the rotation axis H. Each of the nozzle vanes 21 rotates synchronously around respective axes parallel to the rotation axis H. When the plurality of nozzle vanes 21 rotate as described above, a spacing between the nozzle vanes 21 adjacent to each other widens and narrows, so that an opening degree of the nozzle passage 19 is adjusted.

The turbine 2 includes a variable nozzle 20 for driving the nozzle vanes 21 as described above. The variable nozzle 20 is fitted inside the turbine housing 4. The variable nozzle 20 includes the plurality of nozzle vanes 21 and two nozzle rings 23 and 27 that sandwich the nozzle vanes 21 therebetween in the axis direction. The two nozzle rings 23 and 27 are arranged in the axial direction, and the nozzle ring 23 (second nozzle ring) is disposed closer to a bearing housing 13 than the nozzle ring 27 (first nozzle ring). The nozzle rings 23 and 27 each have a ring shape around the rotation axis H, and are disposed to surround the turbine impeller 6 in the circumferential direction. A region sandwiched between the two nozzle rings 23 and 27 in the axial direction forms the nozzle passage 19 described above. Further, the variable nozzle 20 includes a drive mechanism 29 for driving the nozzle vanes 21. The drive mechanism 29 is accommodated in a space between the nozzle ring 23 and the bearing housing 13, and transmits a driving force from an external actuator (not shown) to the nozzle vanes 21.

A heat shield plate 31 is provided between the turbine impeller 6 and the bearing housing 13. The heat shield plate 31 shields the bearing housing 13 from radiant heat on a turbine housing 4 side of high temperature to suppress an increase in temperature of the bearing housing 13. The heat shield plate 31 has an annular shape that surrounds the rotation shaft 14 in the circumferential direction. The heat shield plate 31 is fitted into a central opening of the nozzle ring 23 from a side of the bearing housing 13.

A disk spring 35 (spring member) is sandwiched between the heat shield plate 31 and the bearing housing 13. The disk spring 35 is disposed such that the rotation shaft 14 is inserted through a central hole of the disk spring 35, and is disposed along a conical surface having the rotation axis H as an axis. One end portion of the disk spring 35 in the axial direction is in contact with the bearing housing 13, and the other end portion of the disk spring 35 in the axial direction is in contact with the heat shield plate 31. Then, the disk spring 35 biases the bearing housing 13 and the heat shield plate 31 away from each other in the axial direction.

Details of the disk spring 35 will be described later.

The disk spring 35 biases the variable nozzle 20 and the heat shield plate 31 in the axial direction toward the turbine housing 4 side. Then, the variable nozzle 20 is pressed against the turbine housing 4 and is aligned in the axial direction by a biasing force of the disk spring 35.

The nozzle ring 23 is located between the bearing housing 13 and the nozzle ring 27 and is pressed against the turbine housing 4 in the rotation axis direction by the biasing force of the disk spring 35. Specifically, of the two nozzle rings 23 and 27 of the variable nozzle 20, the nozzle ring 23 located on the bearing housing 13 side includes a flange 23a formed to extend to an outer peripheral side. On the other hand, a protruding strip portion 4a that receives the flange 23a is formed on the turbine housing 4. Then, an end surface of the flange 23a on a side of the turbine housing 4 is pressed against an end surface of the protruding strip portion 4a on a side of the bearing housing 13 by the biasing force of the disk spring 35. The flange 23a is allowed to slide on the protruding strip portion 4a in the radial direction and a difference in thermal expansion in the radial direction between the variable nozzle 20 and the turbine housing 4 is absorbed.

Figure 3:
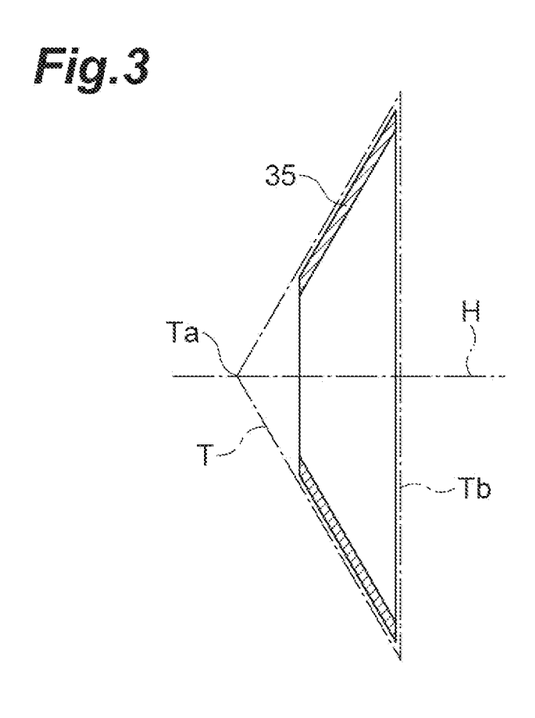
FIG. 3 is a cross-sectional view showing a disk spring of the turbocharger.

The disk spring 35 will be further described. FIG. 3 is a cross-sectional view schematically showing the vicinity of the disk spring 35 inside the turbocharger 1. In FIG. 3, the left side of the drawing is the turbine housing 4 side, the right side is the bearing housing 13 side, and a shape of the disk spring 35 is exaggeratedly depicted compared to the actual shape.

As shown in FIG. 3, the disk spring 35 exists along a conical surface of an imaginary cone T. The imaginary cone T is a cone having the rotation axis H as a cone axis, and a cone bottom surface Tb of the imaginary cone T is located closer to the bearing housing 13 side than a cone apex Ta.

As shown in FIG. 2, a contact point on a radially outer periphery of the disk spring 35 (hereinafter, referred to as a "first contact point P1") is in contact with the heat shield plate 31. In addition, a contact point on a radially inner periphery of the disk spring 35 (hereinafter, referred to as a "second contact point P2") is in contact with the bearing housing 13. Then, the first contact point P1 at which the disk spring 35 comes into contact with the heat shield plate 31 is located closer to the bearing housing 13 side than the second contact point P2 at which the disk spring comes into contact with the bearing housing 13. The first contact point P1 is located further away from the turbine housing 4 than the second contact point P2 in the rotation axis direction.

A protruding strip portion 31a protruding in the axial direction toward the bearing housing 13 is formed on a surface facing the bearing housing 13 of an outer peripheral edge portion of the heat shield plate 31 such that the heat shield plate 31 comes into contact with the first contact point P1 of the disk spring 35. The protruding strip portion 31a extends further to the bearing housing 13 than the second contact point P2 of the disk spring 35, and a tip of the protruding strip portion 31a is in contact with the first contact point P1 of the disk spring 35.

Figure 4A:
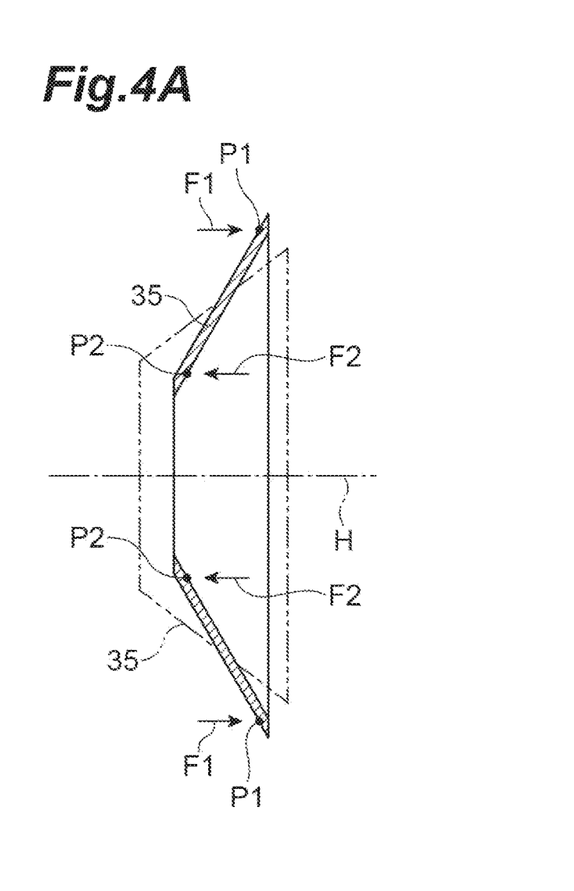
FIG. 4A is a cross-sectional view showing a deformed state of the disk spring of FIG. 3.
Figure 4B:
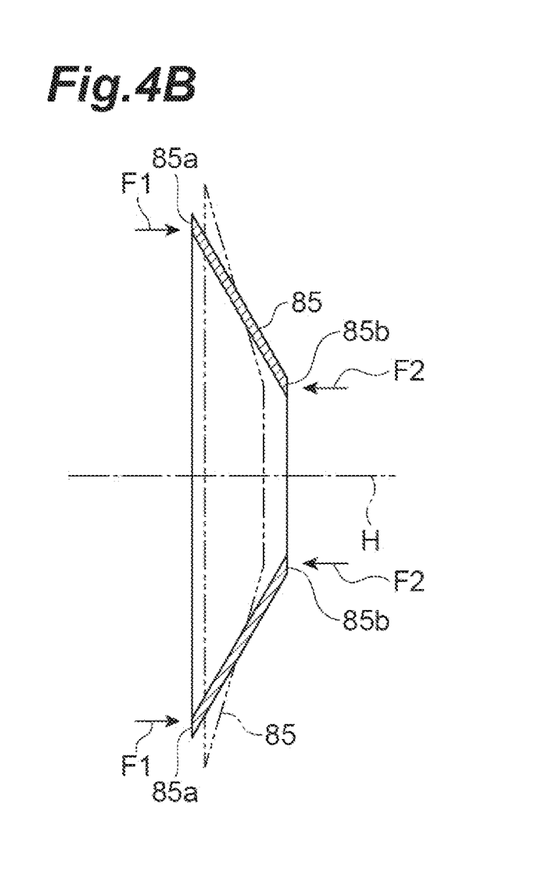
FIG. 4B is a cross-sectional view showing a deformed state of a disk spring of a comparative example.

FIG. 4A is a cross-sectional view showing a deformed state of the disk spring 35. FIG. 4B is a cross-sectional view showing a deformed state of a disk spring 85 of the comparative example (for example, described in Japanese Unexamined Patent Publication No. 2013-68153 described above), when applied to the turbocharger 1 for comparison. In FIGS. 4(a) and 4(b), the left side of the drawings is the turbine housing 4 side, the right side is the bearing housing 13 side, and in each drawing, shapes of the disk springs 35 and 85 are exaggeratedly depicted compared to the actual shapes.

As shown in FIG. 4A, the disk spring 35 receives a reaction force F1 that pushes the first contact point P1 toward the bearing housing 13 side, from the heat shield plate 31. In addition, the disk spring 35 receives a reaction force F2 that pushes the second contact point P2 toward a variable nozzle 20 side, from the bearing housing 13. As indicated by a chain double-dashed line in FIG. 4A, the disk spring 35 is elastically deformed by these reaction forces F1 and F2 such that the first contact point P1 and the second contact point P2 move away from each other in the axial direction. Furthermore, the disk spring 35 has a repulsive force that tries to restore the deformation, and as described above, biases the variable nozzle 20 and the bearing housing 13 to widen a spacing therebetween in the axial direction. The disk spring 35 is configured to generate a biasing force that biases the variable nozzle 20 away from the bearing housing 13 to widen a spacing between the variable nozzle 20 and the bearing housing 13 in a rotation axis direction. The disk spring 35 includes an outer peripheral portion that applies the biasing force to the variable nozzle 20 and an inner peripheral portion that comes into contact with the bearing housing 13. The outer peripheral portion of the disk spring 35 is located further away from the turbine housing 4 than the inner peripheral portion of the disk spring 35 in the rotation axis direction. Namely, the disk spring 35 is used in a state where the disk spring 35 is elastically deformed to extend in the axial direction by receiving a tensile load in the axial direction. In such a manner, the disk spring 35 is used in a load state opposite that of the ordinary disk spring that is elastically deformed to contract in the axial direction by receiving a compressive load in the axial direction. As described above, the variable nozzle 20 is pressed against the turbine housing 4 and is aligned in the axial direction by the biasing force of the disk spring 35.

On the other hand, a case where the disk spring 85 of the comparative example shown in FIG. 4B is applied to the turbocharger 1 will be described. In this case, as shown in FIG. 4B, the disk spring 85 receives the reaction force F1 that pushes an outer peripheral side 85a toward the bearing housing 13, from the heat shield plate 31. In addition, the disk spring 85 receives the reaction force F2 that pushes an inner peripheral side 85b toward the variable nozzle 20 side, from the bearing housing 13. As indicated by a chain double-dashed line in FIG. 4B, the disk spring 85 is elastically deformed by these reaction forces F1 and F2 such that the outer peripheral side 85a and the inner peripheral side 85b approach each other in the axial direction. Furthermore, the disk spring 85 has a repulsive force that tries to restore the deformation, and as described above, biases the variable nozzle 20 and the bearing housing 13 to widen the spacing therebetween in the axial direction. As described above, the variable nozzle 20 is pressed against the turbine housing 4 and is aligned in the axial direction by a biasing force of the disk spring 85.

Subsequently, actions and effects obtained by the turbocharger 1 of the present example including the disk spring 35 described above will be described. In the turbocharger 1 that is in operation, the variable nozzle 20 side is at high temperature due to being affected by high temperature gas, whereas the bearing housing 13 side is at relatively low temperature due to being cooled by water cooling, oil cooling, or the like. For example, a cooling water passage 13a (refer to FIG. 2) for cooling is formed in the bearing housing 13.

Under this condition, when the disk spring 85 of the comparative example in FIG. 4B is used, the outer peripheral side 85a of the disk spring 85 comes into contact with the heat shield plate 31 on the variable nozzle 20 side and is at relatively high temperature, whereas the inner peripheral side 85b comes into contact with the bearing housing 13 and is at relatively low temperature. Accordingly, the disk spring 85 has a temperature distribution in which the outer peripheral side is at high temperature and the inner peripheral side is at low temperature. Then, according to this temperature distribution, the outer peripheral side of the disk spring 85 extends in the circumferential direction compared to the inner peripheral side, and as a result, thermal deformation occurs in the disk spring 85 in the same direction as that of the above-described deformation by the reaction forces F1 and F2 (chain double-dashed line in FIG. 4B). Then, a spring load with which the disk spring 85 biases the variable nozzle 20 decreases due to the thermal deformation.

On the other hand, in the turbocharger 1 of the present example in which the disk spring 35 is used, similarly to the above description, the first contact point P1 on the outer peripheral side is at relatively high temperature, and the second contact point P2 on the inner peripheral side is at relatively low temperature, so that the disk spring 35 has a temperature distribution in which the outer peripheral side is at high temperature and the inner peripheral side is at low temperature similarly to the above description. Then, according to this temperature distribution, thermal deformation occurs in the disk spring 35 in a direction opposite that of the above-described deformation by the reaction forces F1 and F2 (chain double-dashed line in FIG. 4A). Namely, the thermal deformation of the disk spring 35 in this case is deformation in a direction in which the reaction forces F1 and F2 are pushed back. Then, a spring load with which the disk spring 35 biases the variable nozzle 20 further increases due to the thermal deformation. Therefore, according to the turbocharger 1 of the present example, a reduction in the spring load of the disk spring 35 at high temperature may be suppressed.

In addition, in the case of employing the disk spring 85 of FIG. 4B, it may be needed to repeatedly perform a thermal deformation analysis while finely adjusting the shape of the disk spring 85, and to design the shape of the disk spring 85 so as to reduce the reduction in the spring load while also considering influences such as thermal deformation of components around the disk spring 85. In addition, since the above-described design loop may be needed for each model change of the turbocharger 1, it may not be said that efficiency of the design process is good. On the other hand, according to the disk spring of the present example, such a complicated design process may be simplified.

In addition, according to the disk spring 35 of the present example, since radial stress generated in the disk spring 35 is tensile stress in the deformation by the reaction forces F1 and F2, there is also an effect that buckling distortion of the disk spring 35 is unlikely to occur.

In addition, in the turbocharger 1 of the present example, the heat shield plate 31 exists to reduce heat input to the disk spring 35. As a result, a reduction in the Young's modulus of a material of the disk spring due to an increase in temperature is suppressed, and a reduction in the spring load is further suppressed. In addition, the possibility of occurrence of the creeping of the disk spring 35 due to an increase in temperature, a reduction in yield stress, or the like is reduced.

In addition, in the turbocharger 1 of the present example, the alignment of the variable nozzle 20 in the axial direction is achieved by pressing of the flange 23a of the nozzle ring 23 against the protruding strip portion 4a of the turbine housing 4. During operation of the turbocharger 1, the protruding strip portion 4a is displaced by thermal deformation of the turbine housing 4, and the variable nozzle 20 is deformed according to the deformation of the protruding strip portion 4a.

Here, it is considered that during operation of the turbocharger 1, among portions of the turbine housing 4, the closer a portion is to a joint with the bearing housing 13, the smaller a displacement of the portion due to thermal deformation is. Among other parts of the variable nozzle the nozzle ring 23 of the variable nozzle 20 is located relatively close to the bearing housing 13. For this reason, the protruding strip portion 4a of the turbine housing 4 is also located close to the joint with the bearing housing 13. Therefore, during operation of the turbocharger 1, a displacement of the protruding strip portion 4a is kept relatively small, and as a result, deformation of the variable nozzle 20 due to the displacement of the protruding strip portion 4a is also kept relatively small.

Figure 5:
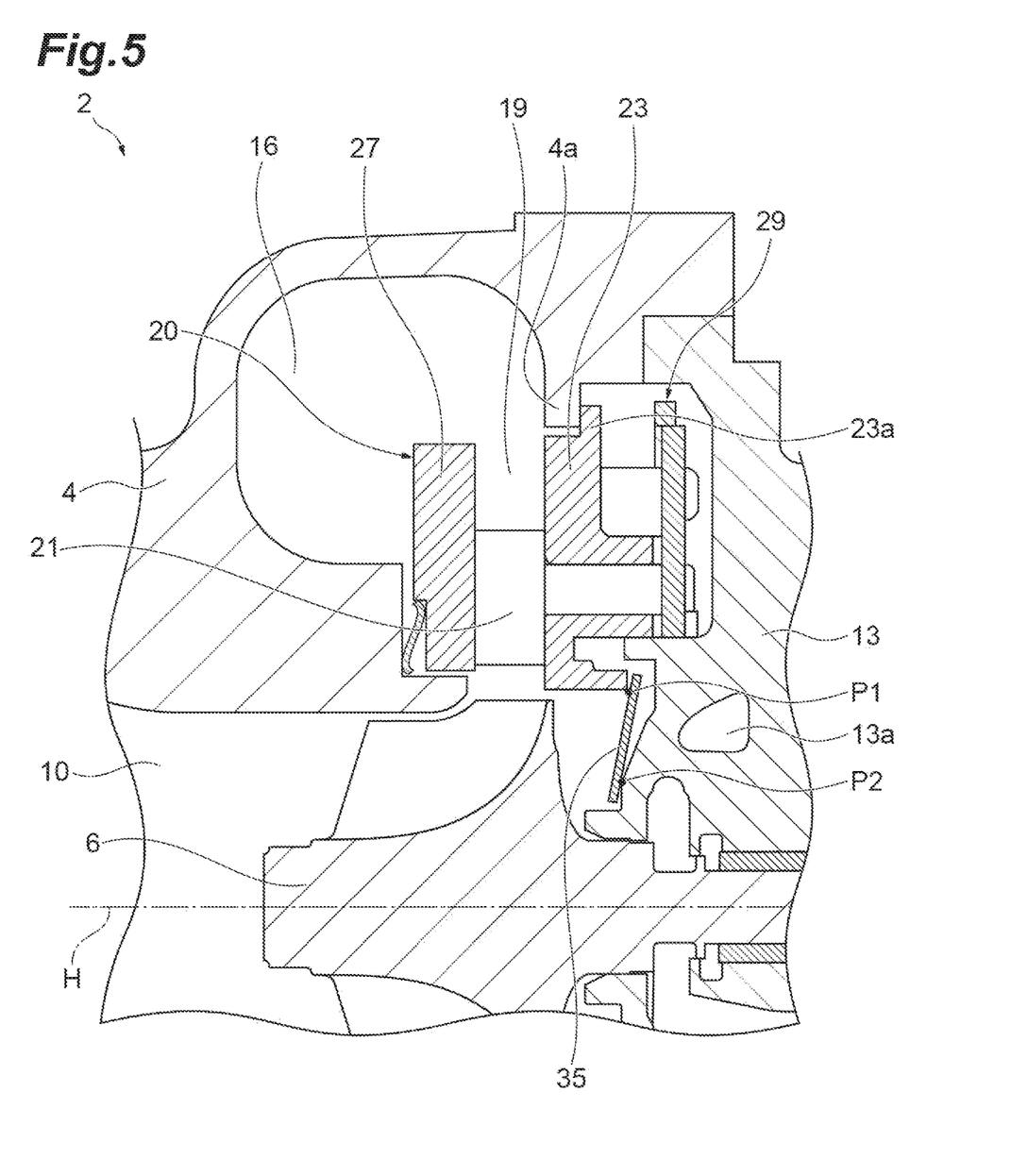
FIG. 5 is another enlarged cross-sectional view showing the vicinity of a variable nozzle of the turbocharger.

The turbocharger of the present disclosure can be implemented in various modes with various changes or improvements made based on the knowledge of those skilled in the art, including the example described above. For example, in the example described above, the turbocharger 1 includes the heat shield plate 31, but as shown in FIG. 5, the heat shield plate 31 may be omitted and the spring member 35 may come into direct contact with the nozzle ring 23. In this case, the shape of the nozzle ring 23 is changed, so that the spring member 35 comes into contact with the nozzle ring 23 (variable nozzle side) at the first contact point P1 on the outer peripheral side of the spring member 35, and comes into contact with the bearing housing 13 at the second contact point P2 on the inner peripheral side, and the first contact point P1 is located closer to the bearing housing side than the second contact point P2 in the rotation axis direction. For example, in this case, instead of the protruding strip portion 31a described above, a protruding strip portion which extends further to the bearing housing 13 than the second contact point P2 of the spring member 35 and of which a tip comes into contact with the first contact point P1 of the spring member 35 may be provided on the nozzle ring 23. The spring member 35 comes into contact with the nozzle ring 23 at a first contact point P1 located on an outer peripheral portion of the spring member 35, and comes into contact with the bearing housing 13 at a second contact point P2 located on an inner peripheral portion of the spring member 35. The first contact point P1 is located further away from the turbine housing 4 than the second contact point P2 in the rotation axis direction.

The invention claimed is:

1. A turbocharger comprising:
a variable nozzle disposed between a turbine housing and a bearing housing; and
a spring having an annular shape, wherein the spring is disposed between the variable nozzle and the bearing housing, and is configured to generate a biasing force that biases the variable nozzle away from the bearing housing to widen a spacing between the variable nozzle and the bearing housing in a rotation axis direction,
wherein the spring comprises:
an outer peripheral portion that applies the biasing force to the variable nozzle; and
an inner peripheral portion that comes into contact with the bearing housing, and
wherein the outer peripheral portion of the spring is located further away from the turbine housing than the inner peripheral portion of the spring in the rotation axis direction.

2. The turbocharger according to claim 1,
wherein the spring is a disk spring that exists along a conical surface of an imaginary cone having a rotation axis of the turbocharger as a cone axis.

3. The turbocharger according to claim 2,
wherein a cone bottom surface of the imaginary cone is located further away from the turbine housing than a cone apex of the imaginary cone in the rotation axis direction.

4. The turbocharger according to claim 1,
further comprising a heat shield plate sandwiched between the variable nozzle and the spring in the rotation axis direction to shield the spring from heat of a turbine,
wherein the spring comes into contact with the heat shield plate at a first contact point located on the outer peripheral portion of the spring.

5. The turbocharger according to claim 4,
wherein the spring comes into contact with the bearing housing at a second contact point located on the inner peripheral portion of the spring.

6. The turbocharger according to claim 5,
wherein the first contact point is located further away from the turbine housing than the second contact point in the rotation axis direction.

7. The turbocharger according to claim 5,
wherein the heat shield plate comprises a protruding portion protruding in the rotation axis direction toward the bearing housing from an outer peripheral edge portion of the heat shield plate, and
wherein the protruding portion of the heat shield plate comes into contact with the first contact point of the spring.

8. The turbocharger according to claim 7,
wherein the protruding portion of the heat shield plate extends further away from the turbine housing than the second contact point in the rotation axis direction.

9. The turbocharger according to claim 5,
wherein the spring biases the variable nozzle and the heat shield plate in the rotation axis direction toward the turbine housing.

10. The turbocharger according to claim 9,
wherein the variable nozzle is pressed against the turbine housing and is aligned in the rotation axis direction by the biasing force of the spring.

11. The turbocharger according to claim 4,
wherein the heat shield plate is fitted into a central opening of the variable nozzle towards a direction from the bearing housing to the turbine housing.

12. The turbocharger according to claim 1,
wherein the variable nozzle comprises a first nozzle ring and a second nozzle ring arranged in the rotation axis direction, and
wherein the second nozzle ring is located between the bearing housing and the first nozzle ring and is pressed against the turbine housing in the rotation axis direction by the biasing force of the spring.

13. The turbocharger according to claim 12,
wherein the second nozzle ring comprises a flange extending towards an outer periphery of the turbocharger, wherein the turbine housing comprises a protruding strip portion that receives the flange of the second nozzle ring, and
wherein an end surface of the flange facing the turbine housing is pressed against an end surface of the protruding strip portion facing the bearing housing by the biasing force of the spring.

14. The turbocharger according to claim 13,
wherein the flange is slidable on the protruding strip portion in a radial direction of the turbocharger.

15. The turbocharger according to claim 1,
wherein the bearing housing comprises a cooling passage to cool the bearing housing.

16. The turbocharger according to claim 15,
wherein a temperature of the outer peripheral portion of the spring is higher than a temperature of the inner peripheral portion of the spring.

* * * * *